US008892731B2

(12) United States Patent
Oki et al.

(10) Patent No.: US 8,892,731 B2
(45) Date of Patent: Nov. 18, 2014

(54) METHOD OF OUTPUTTING ESTIMATED QOES ON A TERMINAL ON AN APPLICATION BASIS

(75) Inventors: Eiji Oki, Tokyo (JP); Naoaki Yamanaka, Tokyo (JP); Yutaka Arakawa, Fukuoka (JP)

(73) Assignee: Empire Technology Development LLC, Wilmington, DE (US)

( * ) Notice: Subject to any disclaimer, the term of this patent is extended or adjusted under 35 U.S.C. 154(b) by 340 days.

(21) Appl. No.: 13/266,579

(22) PCT Filed: Aug. 29, 2011

(86) PCT No.: PCT/JP2011/004805
§ 371 (c)(1),
(2), (4) Date: Oct. 27, 2011

(87) PCT Pub. No.: WO2013/030868
PCT Pub. Date: Mar. 7, 2013

(65) Prior Publication Data
US 2013/0054791 A1   Feb. 28, 2013

(51) Int. Cl.
*G06F 15/16* (2006.01)
*G06F 11/34* (2006.01)

(52) U.S. Cl.
CPC ........ *G06F 11/3409* (2013.01); *G06F 11/3419* (2013.01)
USPC .......................................... 709/224; 709/229

(58) Field of Classification Search
USPC .................. 709/223, 224, 233; 455/405, 509; 370/252, 329; 715/772; 726/1, 22
See application file for complete search history.

(56) References Cited

U.S. PATENT DOCUMENTS

| 6,035,207 | A | 3/2000 | Wang et al. | |
|---|---|---|---|---|
| 7,599,307 | B2 | 10/2009 | Seckin et al. | |
| 7,706,291 | B2* | 4/2010 | Luft et al. | 370/246 |
| 7,929,450 | B2 | 4/2011 | Dolganow et al. | |
| 8,180,385 | B2* | 5/2012 | Aaron et al. | 455/509 |
| 8,280,994 | B2* | 10/2012 | Blouin et al. | 709/223 |
| 8,543,085 | B2* | 9/2013 | Jung | 455/405 |
| 2003/0232614 | A1 | 12/2003 | Squibbs | |
| 2004/0073388 | A1 | 4/2004 | Dorny et al. | |
| 2004/0184461 | A1 | 9/2004 | Forssell et al. | |
| 2006/0069802 | A1 | 3/2006 | Vedantham et al. | |
| 2006/0095864 | A1 | 5/2006 | Mock et al. | |
| 2006/0294582 | A1 | 12/2006 | Linsely-Hood et al. | |
| 2007/0053331 | A1 | 3/2007 | Kolding et al. | |
| 2008/0104228 | A1 | 5/2008 | Dacosta | |
| 2009/0013070 | A1 | 1/2009 | Srivastava et al. | |
| 2009/0086651 | A1 | 4/2009 | Luft et al. | |
| 2009/0180451 | A1 | 7/2009 | Alpert et al. | |

(Continued)

FOREIGN PATENT DOCUMENTS

EP   2154647   2/2010

OTHER PUBLICATIONS

International Search Report mailed on Sep. 27, 2011.

(Continued)

*Primary Examiner* — Quang N Nguyen
(74) *Attorney, Agent, or Firm* — Brundidge & Stanger, P.C.

(57) ABSTRACT

Implementations and techniques for outputting information about estimated QoEs on a terminal on which plural applications can be executed are generally disclosed. The estimated QoEs may be obtained by performing QoE estimation on an application basis.

16 Claims, 9 Drawing Sheets

(56) References Cited

U.S. PATENT DOCUMENTS

| | | | |
|---|---|---|---|
| 2009/0219811 | A1 | 9/2009 | Dolganow et al. |
| 2010/0008224 | A1 | 1/2010 | Lyonnet et al. |
| 2010/0248643 | A1* | 9/2010 | Aaron et al. ............... 709/233 |
| 2010/0268524 | A1* | 10/2010 | Nath et al. ............... 709/224 |
| 2011/0019542 | A1 | 1/2011 | Bernstein et al. |
| 2011/0149775 | A1 | 6/2011 | Lee et al. |
| 2011/0202593 | A1 | 8/2011 | Vaderna et al. |
| 2011/0211464 | A1 | 9/2011 | Chetlur et al. |
| 2011/0243553 | A1 | 10/2011 | Russell |
| 2011/0267948 | A1 | 11/2011 | Koc et al. |
| 2011/0280138 | A1* | 11/2011 | Terry ............... 370/252 |
| 2011/0317631 | A1* | 12/2011 | Navda et al. ............... 370/329 |
| 2012/0149382 | A1 | 6/2012 | Fox et al. |
| 2012/0155398 | A1 | 6/2012 | Oyman et al. |
| 2013/0055136 | A1* | 2/2013 | Aaron et al. ............... 715/772 |
| 2013/0148525 | A1* | 6/2013 | Sanchez et al. ............... 370/252 |

OTHER PUBLICATIONS

Akira Takahashi, "Standardization activities for QoE assessment of multimedia services", IEICE Technical Report, Communication Quality (CQ), 107 (19), 49-54, Apr. 16, 2007, the Institute of Electronics, Information and Communication Engineers.

"Objective Video Quality Assessment Technology Developed by NTT Adopted in an International Standard", http://www.ntt.co.jp/news/news08/0808/080825a.html.

A. Takahashi, D. Hands, V. Barriac, "Standardization Activities in the ITU for a QoE Assessment of IPTV", IEEE Communications Magazine, vol. 46, No. 2, pp. 78-84, 2008.

David Soldani, Man Li, and Renaud Cuny, "QoS and QoE Management in UMTS Cellular Systems", http://onlinelibrary.wiley.com/doi/10.1002/9780470034057.fmatter/pdf.

Hyun-Jong Kim, Dong-Hyeon Lee, Jong-Min Lee, Kyoung-Hee Lee, Won Lyu, and Seong-Gon Choi, "The QoE Evaluation Method through the QoS-QoE Correlation Model", 2008 Fourth International Conference on Networked Computing and Advanced Information Management, ncm, vol. 2, pp. 719-725, 2008.

International Search Report with Written Opinion issued in related application No. PCT/US2011/066702 on Mar. 7, 2012.

\* cited by examiner

METHOD OF OUTPUTTING ESTIMATED QOES ON A TERMINAL ON AN APPLICATION BASIS

BACKGROUND

Unless otherwise indicated herein, the approaches described in this section are not prior art to the claims in this application and are not admitted to be prior art by inclusion in this section.

For a user who wants to uses a particular application on a terminal, it is useful to know how much QoE can be obtained if the application is actually performed on a terminal.

Therefore, it is desired to provide useful ways of outputting information about estimated QoEs on a terminal.

SUMMARY

According to an embodiment, a method of outputting information about estimated QoEs on a terminal is provided. The method may include performing QoE estimation on an application basis; and outputting, based on the QoE estimation, information about estimated QoEs on the terminal.

BRIEF DESCRIPTION OF DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
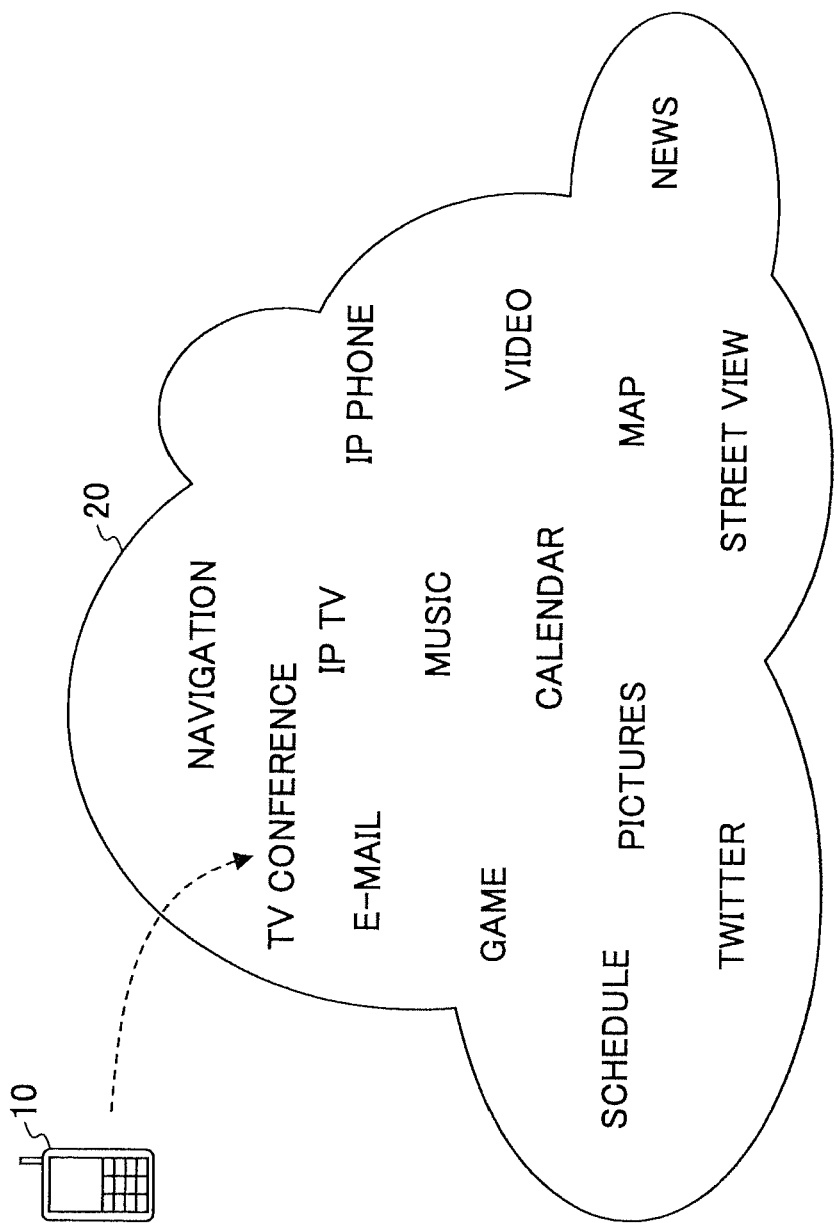
FIG. 1 shows a conceptual diagram of cloud computing.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

FIG. 1 shows a conceptual diagram of cloud computing. As shown in FIG. 1, a user of a terminal 10 can enjoy various applications, such as E-mail, Calendar, etc., in a cloud 20 or via a cloud 20.

The terminal 10 may be of any type. The terminal 10 may be a smartphone, a tablet, a laptop computer, a desktop computer or the like.

The cloud 20 may be an inclusive element which includes elements of communication networks to be accessed by the terminal 10. In other words, the cloud 20 may include the elements which enable applications to be executed on the terminal 10. The cloud 20 may include the Internet and various service providers such as [Google], [Yahoo], etc.

The terminal 10 may be configured to perform QoE estimation on an application basis. Specifically, the terminal 10 may be configured to estimate a QoE (Quality of Experience) for the respective applications, which can be executed on the terminal 10, on an application basis.

Here, the QoE (Quality of Experience) of an application may depend on factors such as the status of the wireless access network, the status of the core network, and the status inside the cloud 20. The QoE may indicate quality of communication required by a user. Thus, the QoE may differ from application to application. Further, the QoE may differ from user to user.

A way of estimating the QoE for the application may be various. Any way may be used as long as it can estimate the QoE on an application basis. Some examples of the way of estimating the QoE for the application are described hereinafter.

The terminal 10 may be configured to output information about estimated QoEs of the respective applications on a display of the terminal. The information may be output in various manners. For example, the estimated QoEs of the respective applications may be directly displayed on the display of the terminal. Some examples of the way of outputting information about estimated QoEs of the respective applications are described hereinafter.

Figure 2:
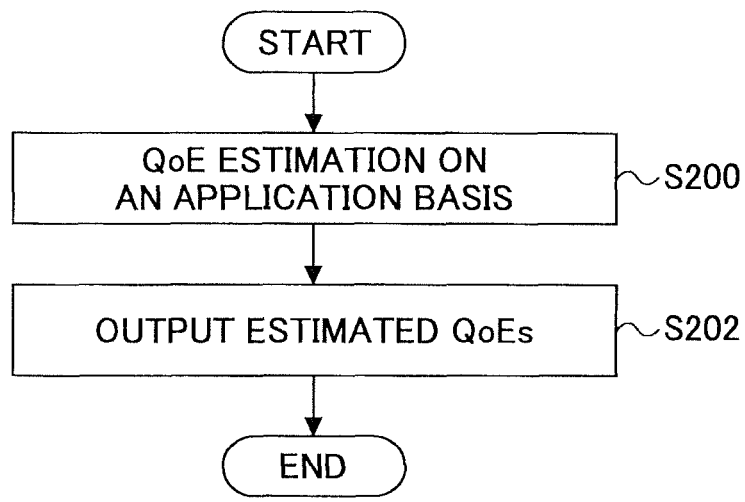
FIG. 2 is a flowchart for showing a process executed by the terminal 10.

FIG. 2 is a flowchart for showing a process executed by the terminal 10.

In step 200, the QoE estimation may be performed on an application basis. For example, if there are four applications, the QoE estimation may be performed for each of the four applications separately. Timing of QoE estimation for each of the four applications may be arbitrary. For example, the QoE estimation for each of the four applications may be performed successively as batch processing or performed at intervals over time.

The QoE estimation may be performed using a criterion. The criterion may be different from application to application. Thus, the criterion may be set on an application basis.

The criterion may be set in advance as a default criterion. The criterion may be set based on user data of the terminal. The user data may include information which indicates needs or preferences of the user of the terminal 10. Such information may be derived statistically from the data obtained during actual operations of the terminal 10 by the user, or may be input directly by the user. For example, the default criterion may be corrected according to the input from the user.

In step 202, the information about estimated QoEs of the respective applications may be output on the display of the terminal. The information about estimated QoE of the application may be output (updated) when the QoE estimation for the application has completed. Thus, the information about estimated QoEs of the respective applications may be output (updated) at different timings. The information about estimated QoE of the application may be output (updated) before the application is actually executed on the terminal 10.

Figure 3:
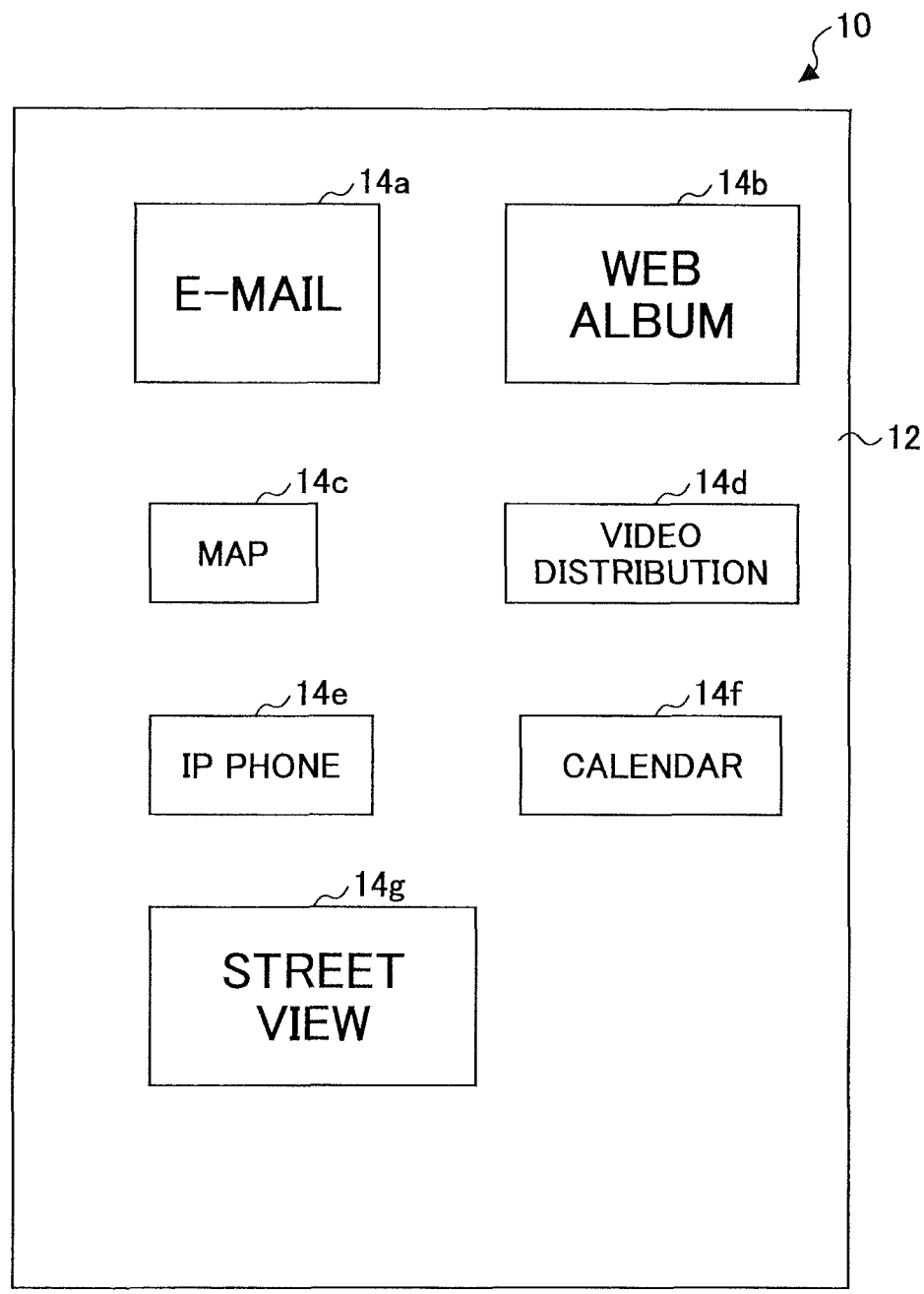
FIG. 3 is a diagram for showing an example of information displayed on a display 12 of the terminal 10.

FIG. 3 is a diagram for showing an example of information displayed on a display 12 of the terminal 10. In FIG. 3, as an example, seven applications (E-mail, Web Album, Map, Video distribution, IP phone, Calendar and Street View) can be executed on the terminal 10.

As shown in FIG. 3, the terminal 10 may be configured to display icons 14*a*-14*g*. The number of icons may depend on the number of the applications. The icons 14*a*-14*g* may be provided for initiating the corresponding applications. In other words, the icons 14*a*-14*g* may be launchers for the corresponding applications. The respective applications may be initiated when the corresponding icons 14*a*-14*g* are activated. The activation of the icons 14*a*-14*g* may be implemented by a click operation, a touch operation or the like. The icons 14*a*-14*g* may include letters or illustrations that indicate the corresponding applications, as shown in FIG. 3.

The terminal 10 may be configured to change colors of icons displayed on the terminal 10 according to the QoE estimation. For example, "Blue" may indicate QoE of "Very good", "Green" may indicate QoE of "Good", "Yellow" may indicate QoE of "Fair", "Red" may indicate QoE of "Bad", and "Gray" may indicate a QoE of "Unusable". For example, if the estimated QoE for the application "E-mail" associated with the icon 14*a* is "Good", the color of the icon 14*a* may be changed to yellow. With this arrangement, the estimated QoEs can be easily distinguished by colors.

It is noted that the icons 14*a*-14*g* may be replaced with links in the case of Web sites or e-mails. The links are often provided on the Web sites or the e-mails. In this case, the links function as launchers for executing the applications. Thus, in this case, the status links, such as colors of the links, may be changed according to the estimated QoEs of the corresponding applications.

Figure 4:
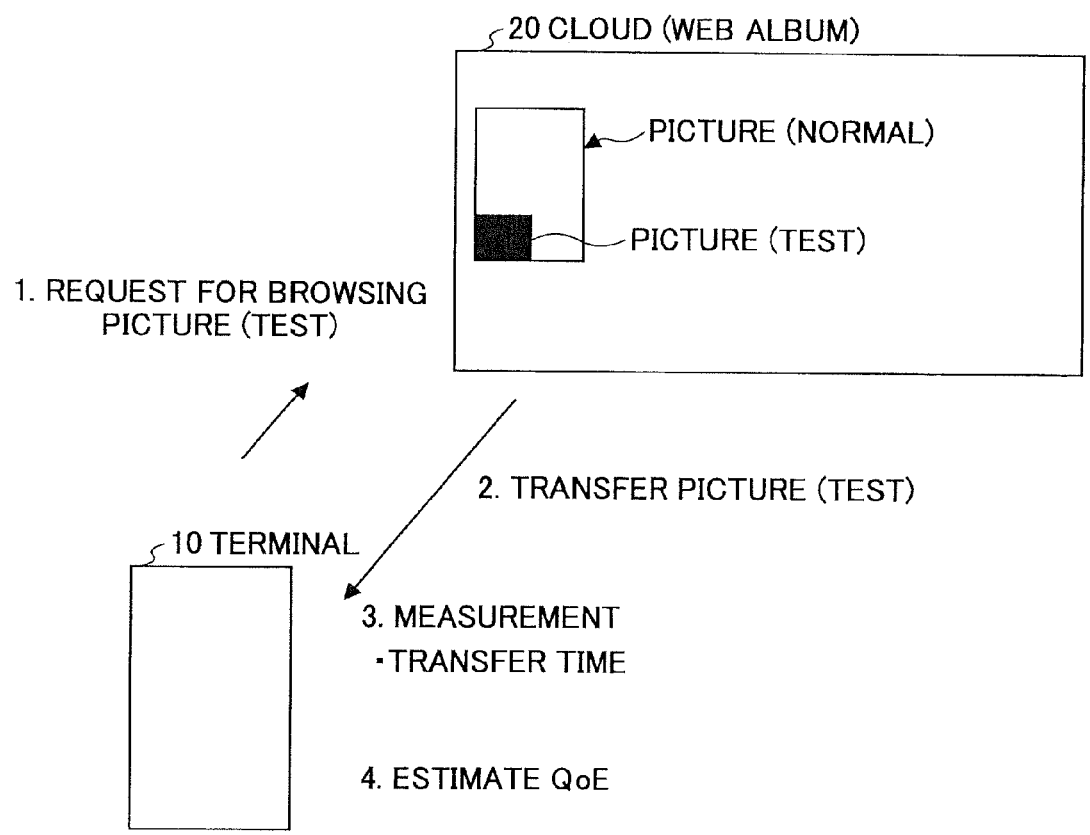
FIG. 4 is a diagram for showing an example of the QoE estimation for the application "Web Album".

FIG. 4 is a diagram for showing an example of the QoE estimation for the application "Web Album". The application "Web Album" may be an application for browsing (viewing) pictures (photos) in the cloud 20. The application "Web Album" may be used for sharing particular pictures with particular parties such as friends and family.

The QoE estimation for the application "Web Album" may be performed by following steps 1-3.

In step 1, the terminal 10 may request browsing of the picture in the cloud 20. Specifically, the terminal 10 may issue a request for test data of the picture to the cloud 20. The test data may be a part of the normal picture as schematically shown in FIG. 4. In other words, the test data may be smaller in a data size than the normal picture. The test data may be prepared specially for the QoE estimation.

In step 2, the cloud 20 may transfer the requested picture to the terminal 10. In other words, the terminal 10 may receive the test data of the picture from the cloud 20.

In step 3, the terminal 10 may measure the transfer time between the request and the reception of the test data of the picture at the terminal 10.

In step 4, the terminal 10 may estimate the QoE for the application "Web Album" based on the measured transfer time. For example, the relationship between the measured transfer time and a criterion may be based on in estimating the QoE. If the measured transfer time is sufficiently shorter than a transfer time according to the criterion, the QoE may be estimated as "Very good". If the measured transfer time is not sufficiently but shorter than a transfer time according to the criterion, the QoE may be estimated as "Good". Similarly, if the measured transfer time is considerably longer than a transfer time according to the criterion, the QoE may be estimated as "Bad". If the measured transfer time is not considerably but longer than a transfer time according to the criterion, the QoE may be estimated as "Fair". If the test data of the picture cannot be received at the terminal 10, the QoE may be estimated as "Unusable". When the estimated QoE is high such as "Very good" or "Good", the user may be recommended to browse high-quality pictures. On the other hand, when estimated QoE is low such as "Bad", the user may be recommended to browse low-quality pictures.

Figure 5:
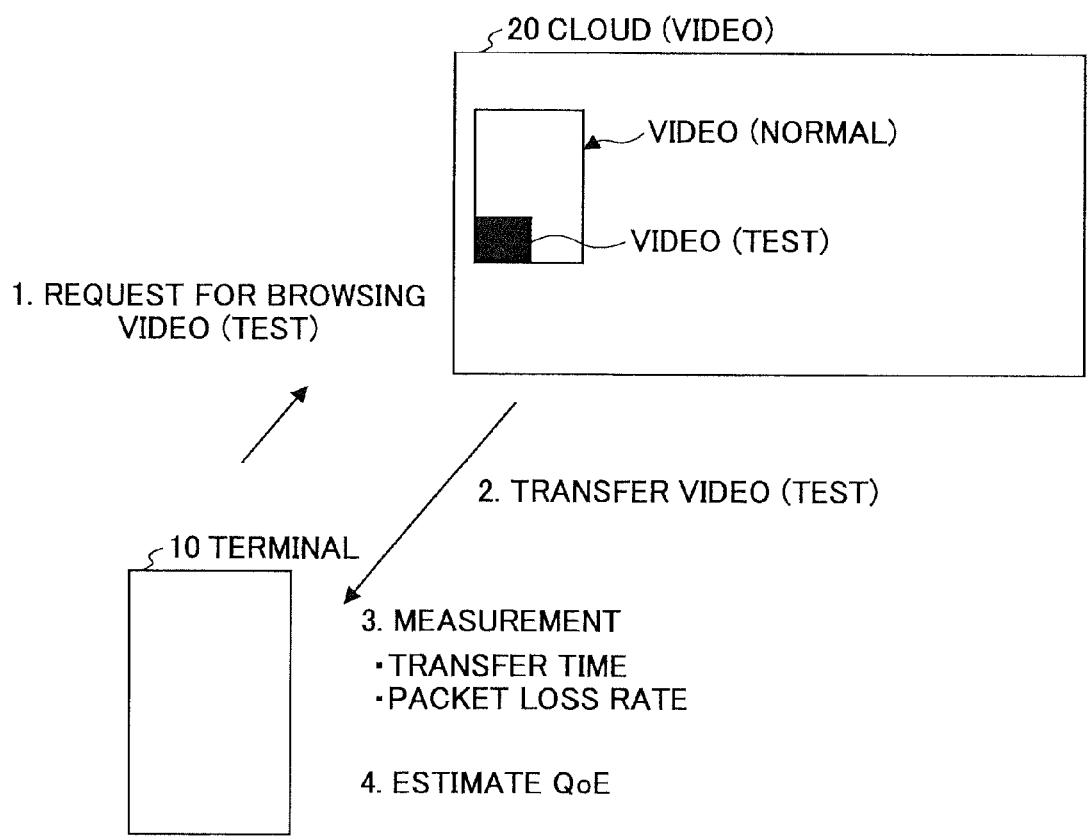
FIG. 5 is a diagram for showing an example of the QoE estimation for the application "Video distribution".

FIG. 5 is a diagram for showing an example of the QoE estimation for the application "Video distribution". The application "Video distribution" may be an application for browsing (viewing) video in the cloud 20. The application "Video distribution" may be such as [YouTube].

The QoE estimation for the application "Video distribution" may be performed by following steps 1-3.

In step 1, the terminal 10 may request browsing of the video in the cloud 20. Specifically, the terminal 10 may issue a request for test data of the video to the cloud 20. The test data may be a part of the normal video as schematically shown in FIG. 5. In other words, the test data may be smaller in a data size than the normal video. The test data may be prepared specially for the QoE estimation.

In step 2, the cloud 20 may transfer the requested video to the terminal 10. In other words, the terminal 10 may receive the test data of the video from the cloud 20.

In step 3, the terminal 10 may measure the transfer time between the request and the reception of the test data of the video at the terminal 10. The terminal 10 may also measure a packet loss rate during the transfer.

In step 4, the terminal 10 may estimate the QoE for the application "Video distribution" based on the measured transfer time and packet loss rate. For example, the relationship between the measured transfer time and packet loss rate and a criterion may be the basis in estimating the QoE. If the measured transfer time and packet loss rate are sufficiently smaller than a transfer time and a packet loss rate according to the criterion, the QoE may be estimated as "Very good". If the measured transfer time and packet loss rate are not sufficiently but smaller than a transfer time and a packet loss rate according to the criterion, the QoE may be estimated as "Good". Similarly, if the measured transfer time and packet loss rate are considerably greater than a transfer time and a packet loss rate according to the criterion, the QoE may be estimated as "Bad". If the measured transfer time and packet loss rate are not considerably but greater than a transfer time and a packet loss rate according to the criterion, the QoE may be estimated as "Fair". If the test data of the video cannot be received at the terminal 10, the QoE may be estimated as "Unusable". When the estimated QoE is high such as "Very good" or "Good", the user may be recommended to browse high-quality video. On the other hand, when estimated QoE is low such as "Bad", the user may be recommended to browse low-quality video.

Figure 6:
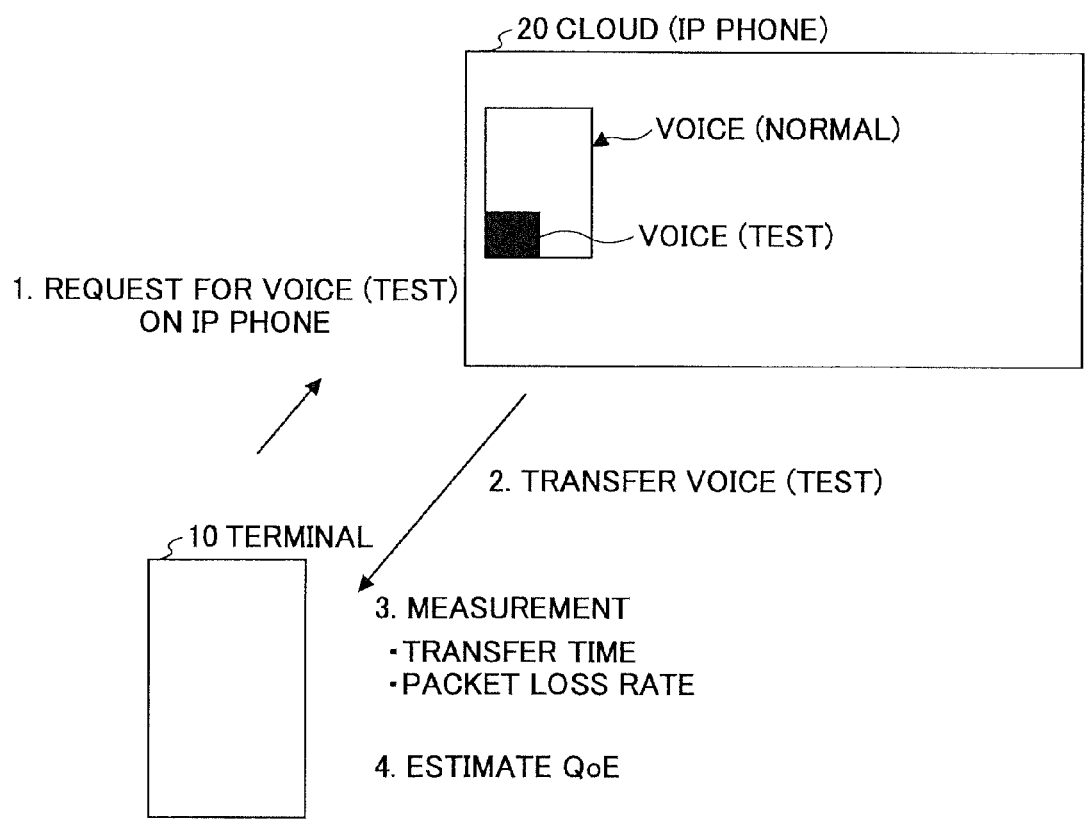
FIG. 6 is a diagram for showing an example of the QoE estimation for the application "IP phone".

FIG. 6 is a diagram for showing an example of the QoE estimation for the application "IP phone". The application "IP phone" may be an application for telephone service using IP (Internet Protocol).

The QoE estimation for the application "IP phone" may be performed by following steps 1-3.

In step 1, the terminal 10 may request transmission of the voice in the cloud 20. Specifically, the terminal 10 may issue a request for test data of the voice to the cloud 20. The test data may be a part of the normal voice data as schematically shown in FIG. 6. In other words, the test data may be smaller in a data size than the normal voice data. The test data may be prepared specially for the QoE estimation.

In step 2, the cloud 20 may transfer the requested voice data to the terminal 10. In other words, the terminal 10 may receive the test data of the voice from the cloud 20.

In step 3, the terminal 10 may measure the transfer time between the request and the reception of the test data of the voice at the terminal 10. The terminal 10 may also measure a packet loss rate during the transfer.

In step 4, the terminal 10 may estimate the QoE for the application "IP phone" based on the measured transfer time and packet loss rate. For example, the relationship between the measured transfer time and packet loss rate and a criterion may be the basis in estimating the QoE. If the measured transfer time and packet loss rate are sufficiently smaller than a transfer time and a packet loss rate according to the criterion, the QoE may be estimated as "Very good". If the measured transfer time and packet loss rate are not sufficiently but smaller than a transfer time and a packet loss rate according to the criterion, the QoE may be estimated as "Good". Similarly, if the measured transfer time and packet loss rate are considerably greater than a transfer time and a packet loss rate according to the criterion, the QoE may be estimated as "Bad". If the measured transfer time and packet loss rate are not considerably but greater than a transfer time and a packet loss rate according to the criterion, the QoE may be estimated as "Fair". If the test data of the voice cannot be received at the terminal 10, the QoE may be estimated as "Unusable".

It is noted that in the examples shown in FIGS. 4-6, any quality factor other than the transfer time and the packet loss rate may be used. For example, quality factor may be any factors related to QoS (Quality of Service), such as S/N. Further, fluctuations in the transfer time and the packet loss rate may be used as quality factors. Similarly, a standard deviation or a variance of the transfer time and the packet loss rate may be used as quality factors.

Figure 7:
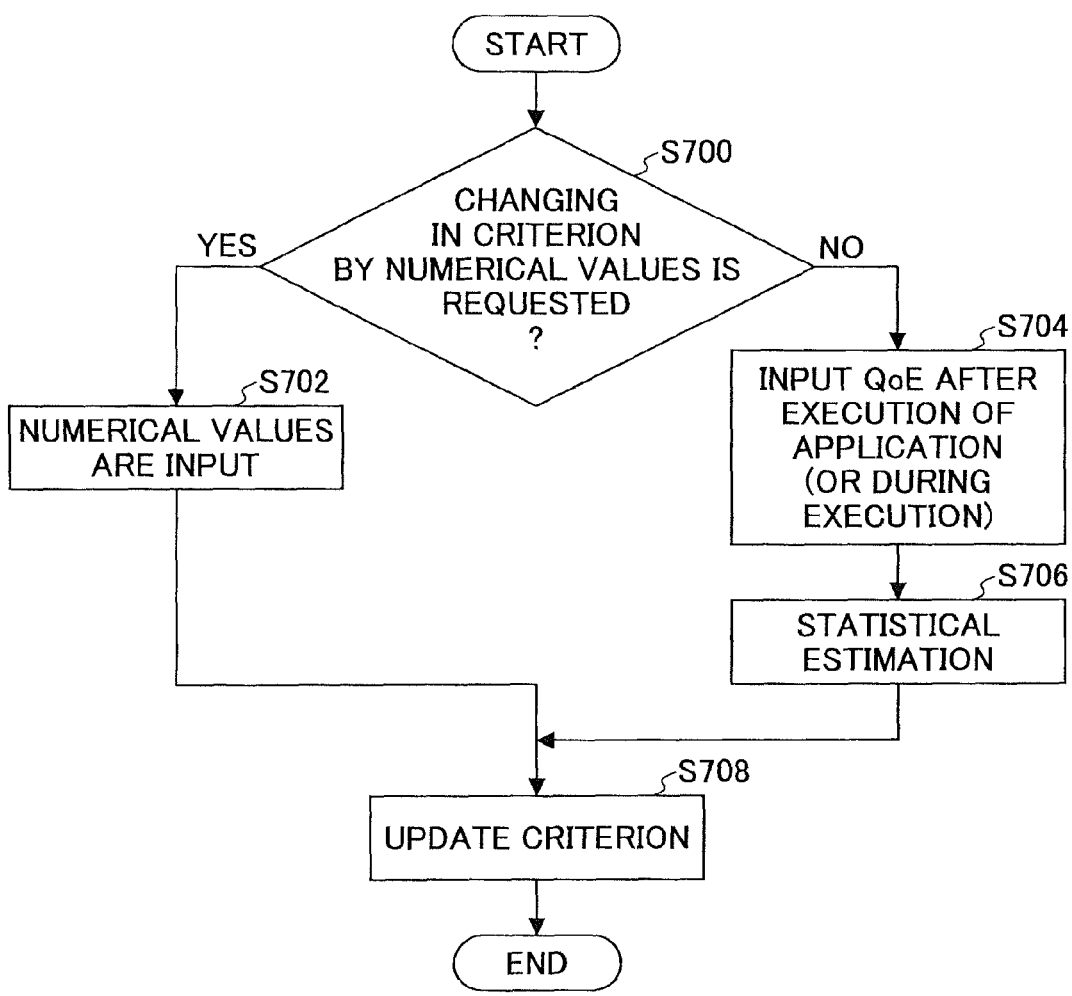
FIG. 7 is a flowchart for showing an example of a way of setting the criterion used in estimating the QoE.

FIG. 7 is a flowchart for showing an example of a way of setting the criterion used in estimating the QoE. The process routine may be performed by the terminal 10. The process routine may be initiated when the change in the criterion is requested. The user may be invited to determine whether to change the criterion when the application is terminated. If the user feels that the output information about the QoE with respect to the application now terminated does not correspond to the user's experience, the user may change the criterion. It is noted that any user data may be input to the terminal 10 via any user interfaces.

In step 700, it may be determined whether the change in the criterion is requested by numerical values. If the change in the criterion is requested by numerical values, the process routine goes to step 702. Otherwise, the process routine goes to step 704.

In step 702, the numerical values from the user may be input. In other words, the terminal 10 may receive user input which indicates the numerical values.

In step 704, the QoE from the user may be input. In other words, the terminal 10 may receive user input which indicates the QoE the user assesses. The input QoE may be based on the actual experience of the user. In this way, the data of QoE from the user may be accumulated based on the execution of the applications. The data of QoE from the user may be stored in a memory (database) on an application basis. In other words, the data of QoE may be stored such that it is associated with the corresponding applications.

In step 706, statistical estimation may be performed based on the accumulated data of QoE from the user. The statistical estimation may be performed to estimate needs or preferences of the user of the terminal 10. For example, the statistical estimation may be performed to determine which quality factor affects the QoE the most.

In step 708, the criterion may be updated (adjusted) based on the numerical values. For example, the criterion may be made stricter or more lenient according to the user input. The criterion may be updated (adjusted) based on the statistical estimation. For example, if the statistical estimation indicates that the user places prime importance on speed in the application "Video distribution", the criterion related to the transfer time may be made stricter.

Figure 8:
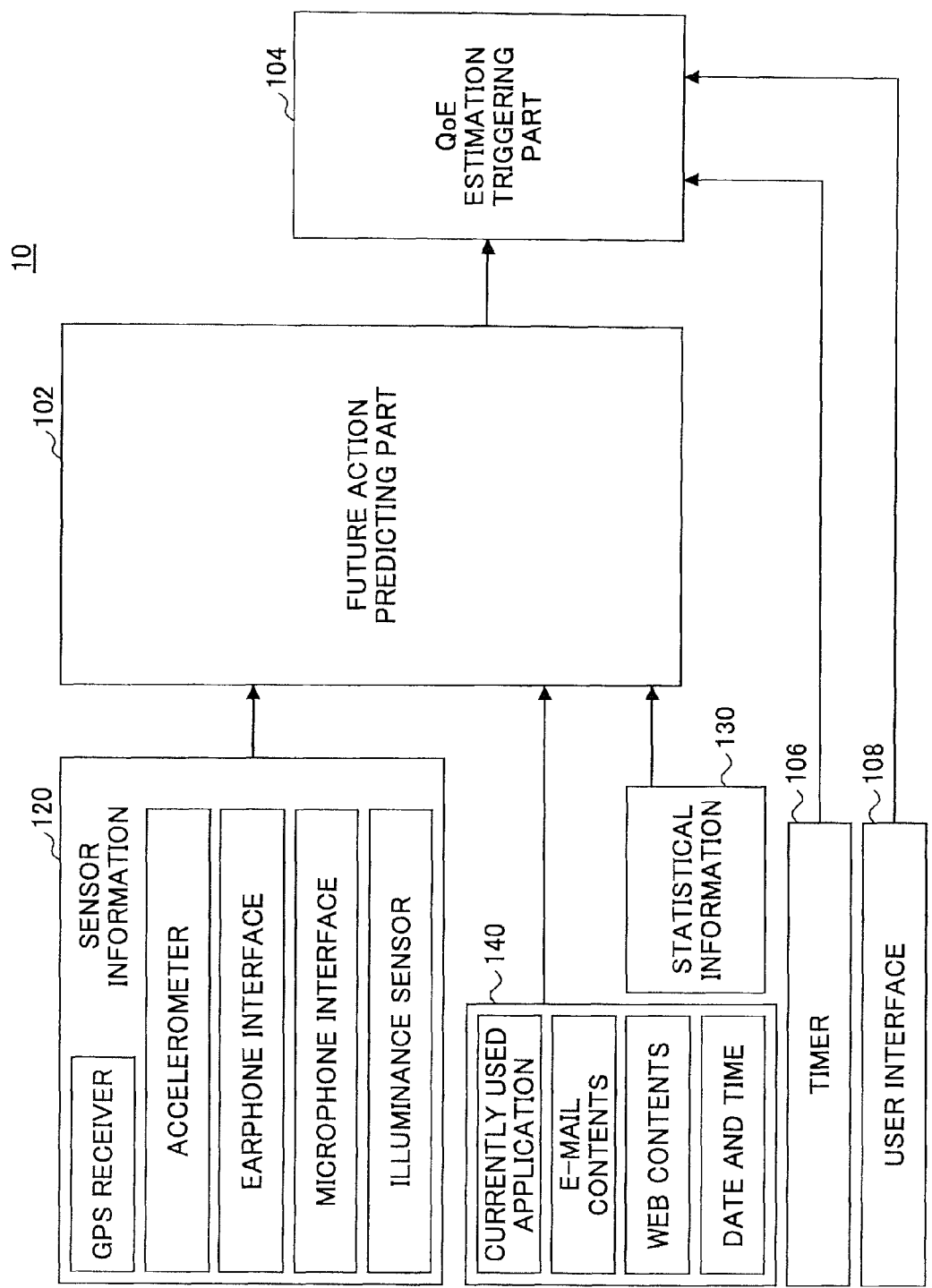
FIG. 8 is a functional block diagram for showing an example of the configuration of the terminal 10.

FIG. 8 is a functional block diagram for showing an example of the configuration of the terminal 10. It is noted that the example shown in FIG. 8 may be implemented independently from other examples described above.

The terminal 10 may include a future action predicting part 102 and a QoE estimation triggering part 104.

The future action predicting part 102 may predict the user's future action. In other words, the future action predicting part 102 may predict which application(s) the user of the terminal 10 uses in the future. For example, the future action predicting part 102 may predict which application(s) the user of the terminal 10 will use within a predetermined time. The predetermined time may be set such that it is longer than the time necessary to perforin the QoE estimation.

The QoE estimation triggering part 104 may determine the timing of performing the QoE estimation. The QoE estimation triggering part 104 may trigger the QoE estimation at a predetermined interval. The predetermined interval may be measured by a timer 106. Further, the QoE estimation triggering part 104 may trigger the QoE estimation in response to a user instruction. The user instruction may be input via the user interface 108.

Further, the QoE estimation triggering part 104 may trigger the QoE estimation based on the prediction of the future action predicting part 102. In other words, the QoE estimation triggering part 104 may determine for which application the QoE estimation is to be performed next and determine the timing of starting the QoE estimation. The timing of triggering (starting) the QoE estimation for the application may be such that the information about the estimated QoE based on the QoE estimation is output before the application is actually executed.

Figure 9:
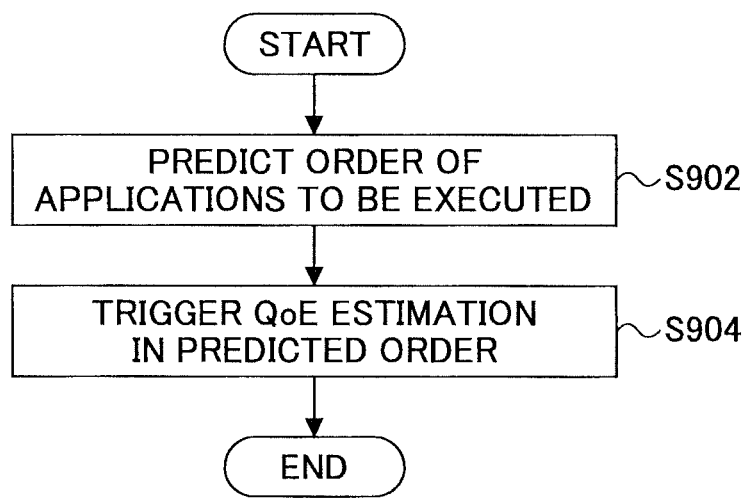
FIG. 9 is a flowchart for showing an example of the operations of the future action predicting part 102 and the QoE estimation triggering part 104.

FIG. 9 is a flowchart for showing an example of the operations of the future action predicting part 102 and the QoE estimation triggering part 104.

In step 902, the future action predicting part 102 may predict an order in which applications are to be executed on the terminal 10. The future action predicting part 102 may predict the order based on the statistical information 130. The statistical information 130 may be accumulated based on the past user's actions.

There may be tendencies of the order in which applications are to be executed on the terminal 10. As examples, the following action patterns may be stored as the statistical information 130.

Action pattern 1: Power on (or Activation)-E-mail (receiving)-Calendar-IP phone-Map-Street View-IP phone-Email (receiving);

Action pattern 2: Power on (or Activation)-E-mail (receiving)-Browser-E-mail (sending)-Web Album;

Action pattern 3: Power on (or Activation)-E-mail (receiving)-Web Album-IP phone-Browser-Calendar; and Action pattern 4: Power on (or Activation)-E-mail (receiving)-IP phone-Browser-Calendar.

Such action patterns may be stored such that they are associated with situations or circumstances such as time (morning, afternoon, night, weekdays, weekends, holiday, etc.), locations (outdoor, indoor, on a train, etc.). In this case, the future action predicting part 102 may predict the action pattern based on the current situation or circumstance. Further, the future action predicting part 102 may simply predict the action pattern most frequently detected.

In step 904, the QoE estimation triggering part 104 may determine the order of the QoE estimation for the respective applications according to the order predicted in step 902. In other words, the QoE estimation triggering part 104 may trigger the QoE estimation for the respective applications according to the order predicted in step 902. For example, if the Action pattern 1 is predicted, the QoE estimation triggering part 104 may trigger the QoE estimation for the application "E-mail" first, the QoE estimation for the application "Calendar" second, and so on.

The results of the QoE estimation may be output on the terminal in the manner described above.

Figure 10:
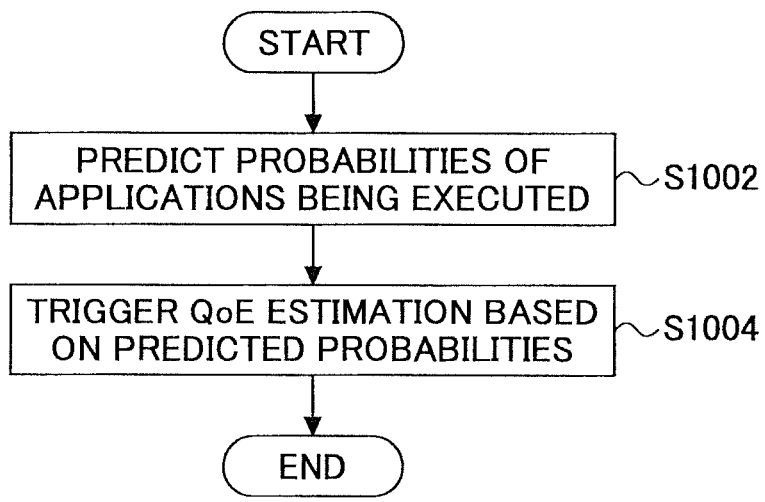
FIG. 10 is a flowchart for showing another example of the operations of the future action predicting part 102 and the QoE estimation triggering part 104.

FIG. 10 is a flowchart for showing another example of the operations of the future action predicting part 102 and the QoE estimation triggering part 104.

In step 1002, the future action predicting part 102 may predict probabilities of the respective applications being executed on the terminal 10.

The future action predicting part 102 may predict the probabilities based on the statistical information 130. The statistical information 130 may be accumulated based on the past user's actions.

For example, the future action predicting part 102 may simply predict the probabilities based on the frequencies of usage of the respective applications. In this case, the future action predicting part 102 may simply predict the highest probability for the most frequently used application.

The future action predicting part 102 may predict the probabilities based on information 140 about the currently used application and the statistical information 130. For example, in the case of the Action patterns 1-4 being stored as the statistical information 130, after using the application "E-mail" for receiving e-mails, four applications, namely, Calendar, Browser, Web Album and IP phone may be used next. Thus, the future action predicting part 102 may increase probabilities with respect to these four applications. In this case, the future action predicting part 102 may compare frequencies of usage between these four applications to determine the application with the highest probability among them.

The future action predicting part 102 may predict the probabilities based on information 140 about the E-mail contents. The E-mail contents may be contents of the E-mail currently opened (displayed) on the terminal 10. In other words, the E-mail contents may be contents of the E-mail the user of the terminal 10 is currently browsing. The E-mail contents may include date information, schedule inquiry, or the like. The E-mail contents may include a Web link. The E-mail contents may include a picture file attached therein and a video file attached therein. The E-mail contents may include a message asking for a call with or without the IP phone number. These contents may be analyzed by an analyzer of the terminal 10. In this case, if the E-mail contents include date information, schedule inquiry, or the like, the future action predicting part 102 may predict the increased probability for the application "Calendar", for example. Similarly, if the E-mail contents include the Web link, the future action predicting part 102 may predict the increased probability for the application "Browser", for example. If the E-mail contents include the picture file, the future action predicting part 102 may predict the increased probability for the application "Web Album", for example. If the E-mail contents include the video file, the future action predicting part 102 may predict the increased probability for the application "Video distribution", for example. If the E-mail contents include the message asking for a call, the future action predicting part 102 may predict the increased probability for the application "IP phone", for example.

The future action predicting part 102 may predict the probabilities based on information 140 about the Web contents, as is the case with the E-mail contents.

The future action predicting part 102 may predict the probabilities based on information 140 about date and time. In the case of weekends (i.e., Saturday and Sunday), the future action predicting part 102 may predict the increased probabilities for the applications "Music", "Game", "Navigation", "Web Album" and "News (general, economy, in particular)", for example. In the case of weekdays, the future action predicting part 102 may predict the increased probability for the application "News", for example. In the case of morning, the future action predicting part 102 may predict the increased probabilities for the applications "Schedule", "E-mail (reading)" and "News (weather, traffic information, in particular)", for example. In the case of afternoon or evening, the future action predicting part 102 may predict the increased probability for the application "E-mail (writing)", for example. In the case of night, the future action predicting part 102 may predict the increased probabilities for the applications "Music", "Game", "Navigation", "Web Album" and "News (general, economy, in particular)", for example.

The future action predicting part 102 may predict the probabilities based on information 120 from sensors installed in the terminal 10. The information 120 from sensors may be such information that indicates an environment in which the terminal 10 is located. For example, sensors may include at least one of a GPS receiver, an accelerometer (or a vibration sensor), an illuminance sensor, a microphone sensor (interface), a power supply connection sensor (interface), and an earphone connection sensor (interface).

For example, the future action predicting part 102 may determine whether the user of the terminal 10 is on the move or stationary based on the information from the GPS receiver. If the user is on the move; the future action predicting part 102 may predict the increased probabilities for the applications "E-mail" and "IPTV", for example. On the other hand, if the user is on the move, the future action predicting part 102 may predict the decreased probability for the application "IP phone", for example. If the user is stationary, the future action predicting part 102 may predict the increased probabilities for the applications "TV conference", "Browser (Web)" and "IP phone", for example.

The information from the GPS receiver and the map information may be cross-referenced to infer the location of the user (i.e., terminal 100). In other words, map matching techniques used in a field of the car navigation may be used. If the user is on a train, the future action predicting part 102 may predict the increased probabilities for the applications "IPTV", "E-mail" and "Twitter", for example. If the user is walking along the road, the future action predicting part 102 may predict the increased probabilities for the applications "IP phone", "Radio", "Map" and "Street View", for example. If the user is driving the car, the future action predicting part 102 may predict the increased probability for the application "Navigation", for example. If the user is in a library, the future action predicting part 102 may predict the increased probabilities for the applications "E-mail" and "Map", for example. On the other hand, if the user is in a library, the future action predicting part 102 may predict the decreased probabilities for the applications "IP phone" and "TV conference", for example. If the user is in a bank, the future action predicting part 102 may predict the increased probabilities for the applications "News (stocks, foreign exchange, in particular)" "IP phone" and "Email", for example. It is noted that the accelerometer may be used as in the case of the GPS receiver described above.

The future action predicting part 102 may determine whether the user of the terminal 10 is in an outdoor environment, an indoor environment, or a dark environment. If the user is in an outdoor environment, the future action predicting part 102 may predict the increased probabilities for the applications "Navigation", "Map" and "Street View", for example. If the user is in an indoor environment, the future action predicting part 102 may predict the increased probabilities for the applications "Browser", "Game", "Email", "Twitter" and "IPTV", for example. If the user is in a dark environment, the future action predicting part 102 may predict the increased probability for the application "Music", for example.

The future action predicting part 102 may determine whether the user is on a train or driving a car based on the sound detected by the microphone sensor. If the user is on a train, the future action predicting part 102 may predict the increased probabilities for the applications "IPTV", "E-mail" and "Twitter", for example. If the user is driving the car, the future action predicting part 102 may predict the increased probability for the application "Navigation", for example.

Further, if a microphone is connected to the terminal 10, the future action predicting part 102 may predict the increased probability for the application "IP phone", for example. Similarly, if it is detected by the earphone connection sensor that an earphone is connected to the terminal 10, the future action predicting part 102 may predict the increased probabilities for the applications "IPTV", "IP phone", "Radio" and "Music", for example. Further, if it is detected by the power supply connection sensor that the battery of the terminal 10 is being charged, the future action predicting part 102 may determine that the user is in an indoor environment and thus may predict the increased probabilities for the applications "Browser", "Game", "E-mail", "Twitter" and "IPTV", for example.

In step 1004, the QoE estimation triggering part 104 may determine the order of the QoE estimation for the respective applications according to the probabilities predicted in step 902. In other words, the QoE estimation triggering part 104 may trigger the QoE estimation for the respective applications according to the probabilities predicted in step 902. For example, the QoE estimation triggering part 104 may trigger the QoE estimation for the respective applications in the decreasing order of the probabilities. Further, the QoE estimation triggering part 104 may stop triggering the QoE estimation for the application(s) whose probability is smaller than a predetermined threshold. In other words, the QoE estimation triggering part 104 may narrow the applications for which the QoE estimation is to be performed.

The results of the QoE estimation may be output on the terminal in the manner described above. For example, if the information 140 about the E-mail contents or the Web contents is used to determine the probability, the results of the QoE estimation may be output on the e-mail or the web site in question. In this case, the information about estimated QoEs may be output on the terminal 10 such that a status (a color, for example) of at least one of a Web link, an attached picture file, an attached video file, a IP phone number, etc., is changed according to the estimated QoE for the corresponding application. For example, the color of the Web link, which is normally blue, may be changed to "Red" if the estimated QoE for the application "Browser" is "Bad".

It is noted that the order and the probability described above may be determined using any combination of the elements described above. For example, the future action predicting part 102 may predict probabilities of the respective applications being executed based on any combination of the statistical information 130, the information 140 about the currently used application, the information 140 about the E-mail contents, the information 140 about date and time, the information 120 from sensors installed in the terminal 10.

It is also noted that the function of the future action predicting part 102 may be implemented by the cloud 20. For example, the cloud 20 may store statistical information about the histories of application operations of the users in general, and predict the next application and operation thereof based on information about both behaviors specific to the user of the terminal 10 and specific to the users in general.

Some portions of the foregoing detailed description are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing device, that manipulates or transforms data represented as physical electronic or magnetic quantities within memories, registers, or other information storage devices, transmission devices, or display devices of the computing device.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of fauns, and that an illustrative embodiment of the subject matter described herein applies regardless of the particular type of signal bearing medium used to actually carry out the distribution. Examples of a signal bearing medium include, but are not limited to, the following: a recordable type medium such as a flexible disk, a hard disk drive (HDD), a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communication link, a wireless communication link, etc.).

The herein described subject matter sometimes illustrates different components contained within, or connected with, different other components. It is to be understood that such depicted architectures are merely examples and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A method of outputting information about estimated QoEs on a terminal on which plural applications can be executed, comprising:
  performing QoE estimation for a plurality of applications on an application basis; and
  outputting, based on the QoE estimation, the information about the estimated QoEs on the terminal;

wherein the QoE estimation is performed by issuing a request for test data to a cloud, receiving the test data from the cloud, measuring at least one quality factor based on the received test data, and estimating a QoE based on a relationship between the measured quality factor and a criterion, the criterion being set based on the user data of the terminal.

2. A method of outputting information about estimated QoEs on a terminal on which plural applications can be executed, comprising:
   performing QoE estimation for a plurality of applications on an application basis; and
   outputting, based on the QoE estimation, the information about the estimated QoEs on the terminal.

3. The method as claimed in claim 2, wherein the QoE estimation is performed using a criterion, the criterion being set based on user data of the terminal.

4. The method as claimed in claim 2, wherein the applications include an application for browsing a picture in the cloud, the test data is picture data and the quality factor associated with the application for browsing the picture includes a transfer time between the request and the reception of the picture data at the terminal.

5. The method as claimed in claim 2, wherein the applications include an application for browsing video in the cloud, the test data is video data and the quality factor associated with the application for browsing the video includes two factors, the factors being a transfer time between the request and the reception of the video data at the terminal, and a packet loss rate during the transfer of the video data.

6. The method as claimed in claim 2, wherein the applications include an application for an IP phone via the cloud, the test data is voice data and the quality factor associated with the application for the IP phone includes two factors, the factors being a transfer time between the request and the reception of the voice data at the terminal, and a packet loss rate during the transfer of the voice data.

7. The method as claimed in claim 2, wherein the outputting the information about the estimated QoEs on the terminal includes changing colors of icons displayed on the terminal according to the QoE estimation, the respective icons being provided for initiating the corresponding applications.

8. The method as claimed in claim 2, further comprising predicting, based on statistical information, order in which applications are to be executed on the terminal, wherein
   the order of the QoE estimation for the respective applications is determined according to the predicted order.

9. The method as claimed in claim 8, wherein the statistical information is information that indicates histories of usage of the applications.

10. The method as claimed in claim 2, further comprising predicting, based on information from sensors installed in the terminal, probabilities of the respective applications being executed on the terminal, wherein
    the application for which the QoE estimation is to be performed is determined according to the predicted probabilities.

11. The method as claimed in claim 10, wherein the information from the sensors is information that indicates an environment in which the terminal is located.

12. The method as claimed in claim 11, wherein the sensors include at least one of a GPS receiver, an accelerometer, a microphone sensor, an illuminance sensor, a power supply connection sensor, and an earphone connection sensor.

13. The method as claimed in claim 2, further comprising predicting, based on information currently displayed on the terminal, probabilities of the respective applications being executed on the terminal, wherein
    the application for which the QoE estimation is to be performed is determined according to the predicted probabilities.

14. The method as claimed in claim 13, wherein the information currently displayed on the terminal includes at least one of a Web link, an attached picture file, an attached video file, an IP phone number and an e-mail address, and
    the QoE estimation is performed for the application which is associated with the information currently displayed on the terminal.

15. The method as claimed in claim 14, wherein outputting the information about the estimated QoEs on the terminal includes changing a status of at least one of the Web link, the attached picture file, the attached video file, the IP phone number, and the e-mail address, according to the QoE estimation for the corresponding application.

16. A terminal on which plural applications can be executed, wherein the terminal is configured to:
    perform QoE estimation for a plurality of applications on an application basis; and
    output, based on the QoE estimation, information about estimated QoEs on a display of the terminal;
wherein the QoE estimation is performed by issuing a request for test data to a cloud, receiving the test data from the cloud, measuring at least one quality factor based on the received test data, and estimating a QoE based on a relationship between the measured quality factor and a criterion, the criterion being set based on the user data of the terminal.

* * * * *

UNITED STATES PATENT AND TRADEMARK OFFICE
CERTIFICATE OF CORRECTION

Page 1 of 1

PATENT NO. : 8,892,731 B2
APPLICATION NO. : 13/266579
DATED : November 18, 2014
INVENTOR(S) : Oki et al.

It is certified that error appears in the above-identified patent and that said Letters Patent is hereby corrected as shown below:

In the Specification

In Column 1, Line 5, under Title, insert -- CROSS-REFERENCE TO RELATED APPLICATION
The present application is a U.S. national stage filing under 35 U.S.C. §371 of International
Application No. PCT/JP2011/004805, filed on Aug. 29, 2011, the entire contents of which
are incorporated herein by reference. --.

In Column 6, Line 40, delete "perforin" and insert -- perform --, therefor.

In Column 8, Line 57, delete "move;" and insert -- move. --, therefor.

In Column 11, Line 22, delete "fauns," and insert -- forms, --, therefor.

In the Claims

In Column 13, Line 14, in Claim 2, delete "terminal." and
insert -- terminal;
wherein the QoE estimation is performed by issuing a request for test data to a cloud,
receiving the test data from the cloud, measuring at least one quality factor based on the
received test data, and estimating a QoE based on a relationship between the measured quality
factor and a criterion, the criterion being set based on the user data of the terminal. --, therefor.

In Column 14, Line 30, in Claim 15, delete "wherein outputting" and insert -- wherein the
outputting --, therefor.

Signed and Sealed this
Second Day of June, 2015

Michelle K. Lee
*Director of the United States Patent and Trademark Office*

UNITED STATES PATENT AND TRADEMARK OFFICE
CERTIFICATE OF CORRECTION

PATENT NO. : 8,892,731 B2  
APPLICATION NO. : 13/266579  
DATED : November 18, 2014  
INVENTOR(S) : Oki et al.

It is certified that error appears in the above-identified patent and that said Letters Patent is hereby corrected as shown below:

In the Claims

In Column 12, Line 60 - Column 13, Line 7, in Claim 1, delete

"1. A method of outputting information about estimated QoEs on a terminal on which plural applications can be executed, comprising:
performing QoE estimation for a plurality of applications on an application basis; and
outputting, based on the QoE estimation, the information about the estimated QoEs on the terminal;
wherein the QoE estimation is performed by issuing a request for test data to a cloud, receiving the test data from the cloud, measuring at least one quality factor based on the received test data, and estimating a QoE based on a relationship between the measured quality factor and a criterion, the criterion being set based on the user data of the terminal."

and insert

--1. A method of outputting information about estimated QoEs on a terminal on which plural applications can be executed, comprising:
predicting, based on at least one of information from sensors installed in the terminal and statistical information, a first application to be executed first on the terminal;
performing QoE estimation for the first application before the first application is actually executed, wherein the QoE estimation is performed by issuing a request for test data associated with the first application to a cloud, receiving the test data from the cloud, measuring a quality factor based on the received test data, and estimating a QoE based on a relationship between the measured quality factor and a corresponding criterion, the criterion being set based on user data of the terminal;
outputting information about an estimated QoE for the first application on the terminal based on the QoE estimation for the first application;
predicting, based on at least one of the information from the sensors installed in the terminal and the statistical information, a second application to be executed next to the first application on the terminal;
performing QoE estimation for the second application after the QoE estimation for the first application Signed and Sealed this  
First Day of September, 2015

Michelle K. Lee  
*Director of the United States Patent and Trademark Office*

CERTIFICATE OF CORRECTION (continued)
U.S. Pat. No. 8,892,731 B2

Page 2 of 2 has been performed, wherein the QoE estimation is performed by issuing a request for test data associated with the second application to the cloud, receiving the test data from the cloud, measuring a quality factor based on the received test data, and estimating a QoE based on a relationship between the measured quality factor and a corresponding criterion, the criterion being set based on the user data of the terminal; and outputting information about an estimated QoE for the second application on the terminal based on the QoE estimation for the second application.--, therefor.